United States Patent
Moffitt et al.

(10) Patent No.: US 11,905,363 B2
(45) Date of Patent: Feb. 20, 2024

(54) BARRIER ENHANCED PET MULTILAYER CONTAINER

(71) Applicant: THE COCA-COLA COMPANY, Atlanta, GA (US)

(72) Inventors: Ronald D. Moffitt, Spartanburg, SC (US); Jasmeet Kaur, Atlanta, GA (US); T. Edwin Freeman, Woodstock, GA (US); Robert Kriegel, Decatur, GA (US); Yu Shi, Marietta, GA (US); Marlon Salvador Morales, Clemson, SC (US); Vidhu Nagpal, Mars, PA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 121 days.

(21) Appl. No.: 15/550,823

(22) PCT Filed: Feb. 11, 2016

(86) PCT No.: PCT/US2016/017458
§ 371 (c)(1),
(2) Date: Aug. 14, 2017

(87) PCT Pub. No.: WO2016/130748
PCT Pub. Date: Aug. 18, 2016

(65) Prior Publication Data
US 2018/0022866 A1    Jan. 25, 2018

Related U.S. Application Data

(60) Provisional application No. 62/116,226, filed on Feb. 13, 2015.

(51) Int. Cl.
*C08G 63/19*    (2006.01)
*B32B 27/08*    (2006.01)
(Continued)

(52) U.S. Cl.
CPC .......... *C08G 63/19* (2013.01); *B29C 49/0005* (2013.01); *B29C 49/22* (2013.01);
(Continued)

(58) Field of Classification Search
CPC ........... B32B 1/02; B32B 27/08; B32B 27/36; B32B 2250/24; B32B 2250/244;
(Continued)

(56) References Cited

U.S. PATENT DOCUMENTS 6,063,465 A * 5/2000 Charbonneau ....... C08G 63/668
                                             264/634
6,150,454 A * 11/2000 Wu .................... C08G 63/20
                                             524/394
(Continued)

FOREIGN PATENT DOCUMENTS

CN        104220482 A    12/2014
JP        2008291244 A    12/2008
(Continued)

OTHER PUBLICATIONS

Tullo, Alexander H., Coke Plays Spin The Bottle, Chemical & Engineering News, vol. 90, Issue 4, p. 19-20, Jan. 23, 2012 (Year: 2012).*
(Continued)

*Primary Examiner* — Lee E Sanderson
(74) *Attorney, Agent, or Firm* — Eversheds Sutherland (US) LLP

(57) ABSTRACT

This disclosure provide new multilayer polyester (particularly PET) containers that have improved gas barrier properties over conventional monolayer PET containers. In particular, a 2,5-furandicarboxylate polyester (for example, poly(ethylene furan-2,5-dicarboxylate) (PEF)) barrier layer that has superior gas barrier and mechanical properties relative to PET, that is "sandwiched" between two PET
(Continued)

layers, has been found to achieve a significantly higher barrier against gas permeation relative to conventional monolayer PET container of the same size and shape. Associated preforms, methods, and compositions are disclosed.

28 Claims, 2 Drawing Sheets

(51) Int. Cl.

| | |
|---|---|
| B32B 27/36 | (2006.01) |
| B32B 1/02 | (2006.01) |
| B29C 49/00 | (2006.01) |
| B29C 49/22 | (2006.01) |
| B65D 1/02 | (2006.01) |
| B65D 23/02 | (2006.01) |
| B65D 85/72 | (2006.01) |
| C08G 63/16 | (2006.01) |
| B65D 23/08 | (2006.01) |
| B65D 81/30 | (2006.01) |
| B32B 27/18 | (2006.01) |
| B29C 49/10 | (2006.01) |
| B32B 7/12 | (2006.01) |
| B29C 49/12 | (2006.01) |
| B29K 67/00 | (2006.01) |
| B29L 31/00 | (2006.01) |

(52) U.S. Cl.
CPC ............... *B32B 1/02* (2013.01); *B32B 27/08* (2013.01); *B32B 27/36* (2013.01); *B65D 1/0215* (2013.01); *B65D 23/02* (2013.01); *B65D 23/0821* (2013.01); *B65D 81/30* (2013.01); *B65D 85/72* (2013.01); *C08G 63/16* (2013.01); *B29C 49/10* (2013.01); *B29C 49/12* (2013.01); *B29K 2067/003* (2013.01); *B29K 2067/04* (2013.01); *B29K 2995/0067* (2013.01); *B29L 2031/7158* (2013.01); *B32B 7/12* (2013.01); *B32B 27/18* (2013.01); *B32B 2270/00* (2013.01); *B32B 2272/00* (2013.01); *B32B 2307/412* (2013.01); *B32B 2307/54* (2013.01); *B32B 2307/542* (2013.01); *B32B 2307/7242* (2013.01); *B32B 2307/7244* (2013.01); *B32B 2307/732* (2013.01); *B32B 2439/60* (2013.01); *B32B 2439/70* (2013.01)

(58) Field of Classification Search
CPC ... B32B 2367/00; B65D 1/0215; C08L 67/02; Y10T 428/1352; Y10T 428/31786; C08G 63/181; C08G 63/183
USPC ............................................. 428/35.7, 36.91
See application file for complete search history.

(56) References Cited

U.S. PATENT DOCUMENTS

| | | | | |
|---|---|---|---|---|
| 6,852,256 | B2* | 2/2005 | Borer | B29B 9/06 |
| | | | | 264/40.6 |
| 2006/0029823 | A1* | 2/2006 | Brown | B32B 1/02 |
| | | | | 428/480 |
| 2008/0113134 | A1* | 5/2008 | Shi | B32B 27/08 |
| | | | | 428/35.7 |
| 2010/0326994 | A1* | 12/2010 | Ichikawa | B29B 11/08 |
| | | | | 220/675 |
| 2013/0065001 | A1* | 3/2013 | Kani | C08K 5/098 |
| | | | | 428/35.7 |
| 2013/0095263 | A1 | 4/2013 | Carman, Jr. et al. | |
| 2013/0095268 | A1 | 4/2013 | Carman, Jr. et al. | |
| 2013/0095270 | A1* | 4/2013 | Carman, Jr. | C08G 63/199 |
| | | | | 428/36.92 |
| 2013/0270212 | A1 | 10/2013 | Collias et al. | |
| 2014/0205786 | A1* | 7/2014 | Nederberg | C08J 5/18 |
| | | | | 428/36.92 |
| 2014/0336349 | A1* | 11/2014 | Sipos | C08G 63/866 |
| | | | | 528/285 |
| 2015/0001213 | A1 | 1/2015 | Nederberg et al. | |
| 2015/0141584 | A1* | 5/2015 | Saywell | C08G 63/181 |
| | | | | 525/444 |
| 2015/0158973 | A9 | 6/2015 | Nederberg et al. | |
| 2015/0307704 | A1* | 10/2015 | Bhattacharjee | B29C 48/022 |
| | | | | 525/444 |
| 2015/0353692 | A1* | 12/2015 | Bhattacharjee | B32B 27/32 |
| | | | | 428/457 |
| 2016/0237206 | A1 | 8/2016 | Nederberg et al. | |
| 2016/0237274 | A1* | 8/2016 | Peirsman | C08K 5/053 |
| 2017/0058119 | A1* | 3/2017 | Brun | C08L 67/02 |

FOREIGN PATENT DOCUMENTS

| | | |
|---|---|---|
| WO | 2013/062408 A1 | 5/2013 |
| WO | 2013149157 A1 | 10/2013 |
| WO | 2013149221 A1 | 10/2013 |
| WO | 2014/032730 A1 | 3/2014 |
| WO | 2014032730 A1 | 3/2014 |
| WO | 2014/100254 A1 | 6/2014 |
| WO | 2014100254 A1 | 6/2014 |

OTHER PUBLICATIONS

Massey, Liesl K. Permeability Properties of Plastics and Elastomers, 2nd ed. Plastics Design Library, Norwich, NY 2003 (Year: 2003).*
Evans, Jon. Various Alternative Options—Biofuels, Bioproducts, and Biorefining, Jun. 12, 2020, available online at https://www.biofpr.com/details/feature/11246586/Various_alternative_options.html (Year: 2020).*
Supplemental European Search Report of Application No. 16749848.4 dated Aug. 20, 2018.
International Search Report and Written Opinion for PCT/US2016/017458, dated May 30, 2016.
The First Office Action from The State Intellectual Property Office of the P.R. China, Patent Application No. 201680010480.7, Feb. 27, 2019, 24 pages.

* cited by examiner

BARRIER ENHANCED PET MULTILAYER CONTAINER

CROSS REFERENCE TO RELATED APPLICATIONS

This application claims the benefit of priority to U.S. Provisional Application No. 62/116,226, filed Feb. 13, 2015, which is incorporated by reference herein in its entirety and is a 35 U.S.C. § 371 national stage application of PCT Patent Application No. PCT/US2016/017458, filed Feb. 11, 2016, which is incorporated by reference in its entirety.

TECHNICAL FIELD

This disclosure relates to polyester beverage bottles such as PET carbonated soft drink bottles having improved barrier enhancement properties, and associated preforms and methods.

BACKGROUND

Polyethylene terephthalate (PET) containers have been widely used for packaging carbonated soft drinks (CSD), juice, water, and other beverages due to its combination of clarity and good mechanical properties. However, the relative susceptibility of PET to permeation by oxygen and carbon dioxide limits its application in smaller sized packages, as well as for the packaging of oxygen sensitive products. Consequently, there is a need in the packaging industry for further improvement of the gas barrier properties of PET.

Various technologies have been developed to enhance the barrier of PET against the permeation of small gas molecules. For example, gas barrier enhancement additives can be incorporated into PET in a monolayer configuration, to increase its modulus and gas barrier properties through an anti-plasticization mechanism. However, high levels of incorporation can degrade the PET and deteriorate its intrinsic viscosity (I.V.), especially when the additive contains functional groups that may react with PET.

Another approach to enhance the gas barrier properties of PET is to incorporate co-monomers in preparing the resin or blending the resin with other components. Examples include PET modified with isophthalate (IPA) co-monomer, blends or copolymers of polyethylene naphthalate (PEN) and PET, and the like. To achieve a moderate barrier enhancement (at least 2-fold), the modification typically requires a high percentage of co-monomers, which can adversely affect stretching properties of the PET and require new preform designs.

Organic or inorganic coatings can be applied to the external or internal surface of the container as a means of increasing its resistance to gas permeation. Implementation of such technologies, however, typically requires substantial capital investment for coating equipment not normally utilized in the manufacture of packaged beverages.

Multi-layered containers have also been developed with a high barrier material sandwiched between two or more PET layers, wherein the barrier material is generally a polymer other than PET. Due to the difference in material composition, multi-layered containers are often prone to delamination, thus impacting appearance and the barrier and mechanical performance of the containers. Further, PET multilayer containers containing polymers such as nylon and EVOH can develop yellowness and haze during recycling due to incompatibility with PET.

Another variation of the multilayer approach is to blend the barrier enhancement additive into PET and sandwich the blend between two PET layers. High levels of incorporation of such additives, can lead to plasticization in the middle layer which substantially impacts the overall mechanical property of the container. Also, at higher temperatures, creep and bottle expansion can diminish the barrier improvement benefits, and operational issues associated with blending such additives can be problematic.

Therefore, there is a continuing need to enhance the barrier performance of PET for use in applications such as packaging carbonated beverages and oxygen sensitive beverages and foods. Methods that do not degrade the PET, substantially impact its stretch ratio, or negatively impact the clarity of the PET are most needed.

SUMMARY

This disclosure provides new multilayer polyester containers such as PET carbonated soft drink bottles having improved barrier enhancement properties. The associated bottle preforms and methods of making the bottle and enhancing the gas barrier properties of PET are also disclosed. These containers are multilayer structures designed for enhanced barrier performance, making the containers especially useful in packaging applications for carbonated beverages and oxygen sensitive beverages and foods. The container design and methods of making the container do not degrade the PET, nor do they substantially impact the PET stretch ratio, meaning the existing equipment and methods can be utilized in fabricating the containers. It is also found that the container design and methods do not negatively affect the clarity of the PET bottle or container.

According to one aspect, there is provided a multilayer container, the container comprising:
  a) an outer layer defining an exterior surface and an inner layer defining an interior surface and interior space, wherein the outer layer comprises a polyester and the inner layer comprises a 2,5-furandicarboxylate polyester (such as, for example, poly(ethylene furan-2,5-dicarboxylate) (PEF) polymer or co-polymer).

In multilayer containers in which the inner layer comprises about 5, 7.5, 10 or more weight % of 2,5-furandicarboxylate polyester (for example, poly(ethylene furan-2,5-dicarboxylate) (PEF)-polymer), the $CO_2$ and/or $O_2$ Barrier Improvement Factor (BIF) in the container relative to a monolayer PET container of substantially the same weight and dimensions can be from about 1.0 to at least 2.0 or greater at about 22° C. and about 38° C.

According to another aspect, there is provided a multilayer container, the container comprising:
  a) an outer layer defining an exterior surface and an inner layer defining an interior surface and interior space, wherein each layer comprises a polyester; and
  b) a barrier layer disposed between the outer layer and the inner layer, the barrier layer comprising a 2,5-furandicarboxylate-based polyester or blend thereof (such as for example poly(ethylene furan-2,5-dicarboxylate) (PEF)-based polymer or co-polymer or blend) that may include a polyester, nylon, polymer, polyethylene copolymers or modified co-polymers thereof, polypropylene copolymers or modified co-polymers thereof, ionomers, acrylonitrile methyl acrylate co-polymers, modified ethyl-propylene co-polymers and modified triblock co-polymers based upon styrene and ethylene-butylene such as KRATON® FG1901X.

In multilayer containers in which the 2,5-furandicarboxylate polyester (for example, poly(ethylene furan-2,5-dicarboxylate) (PEF)-based polymer) comprises at least 5 mol % furan-2,5-dicarboxylic acid co-monomer of the PEF-based polymer and one or more diacid acid co-monomers, the $CO_2$ and/or $O_2$ Barrier Improvement Factor (BIF) in the container relative to a monolayer PET container of substantially the same weight and dimensions can be from about 1.0 to at least 2.0 or more at about 22 C and about 38 C.

This disclosure further provides for a preform, in which the preform can comprise the following:
a) an outer layer defining an exterior surface and an inner layer defining an interior surface, wherein the outer layer comprises a polyester; and the inner layer comprising a 2,5-furandicarboxylate polyester. A prototypical example of a 2,5-furandicarboxylate polyester is poly(ethylene furan-2,5-dicarboxylate) (PEF) polymer.

Accordingly, there is also provided a method of making a multilayer container that uses this preform, the method comprising providing a preform and stretch blow-molding the preform to provide the multilayer container.

This disclosure further provides for a preform, in which the preform can comprise the following:
a) an outer layer defining an exterior surface and an inner layer defining an interior surface, wherein each layer comprises a polyester; and
b) a barrier layer disposed between the outer layer and the inner layer, the barrier layer comprising a 2,5-furandicarboxylate polyester such as poly(ethylene furan-2,5-dicarboxylate) (PEF) polymer or blend thereof that may include a polyester, nylon, polymer, polyethylene copolymers or modified co-polymers thereof, polypropylene copolymers or modified co-polymers thereof, ionomers and acrylonitrile methyl acrylate co-polymers.

Accordingly, there is also provided a method of making a multilayer container that uses this preform, the method comprising providing a preform and stretch blow-molding the preform to provide the multilayer container.

These and other aspects, features, and embodiments of the present disclosure will be understood by reference to the figure, claims, and detailed disclosure provided herein.

BRIEF DESCRIPTION OF THE DRAWINGS

Various aspects and embodiments of this disclosure are illustrated in the drawing provided herein, as follows.

DETAILED DESCRIPTION

Figure 1:
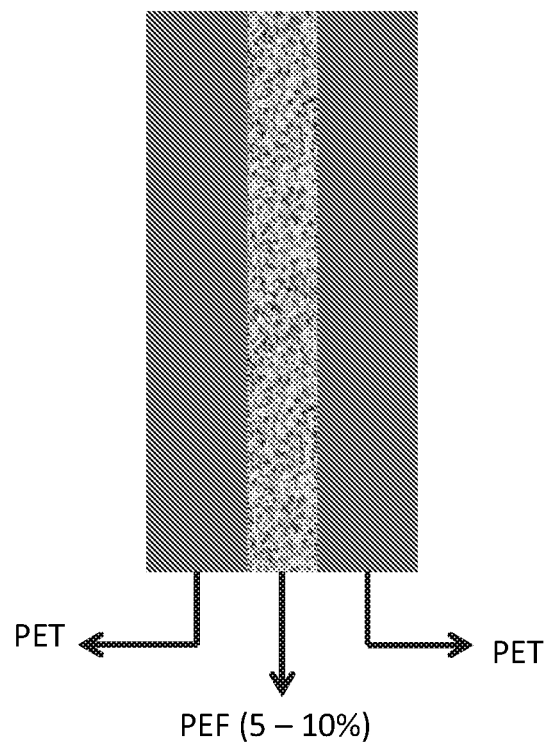
FIG. 1 provides two illustrations of embodiments of this disclosure. One illustration depicting a cross-section of the multilayer container and its PET outer layer defining an exterior surface, and a PEF inner layer defining an interior surface. Another illustration depicts a cross-section of the multilayer container and its PET outer layer defining an exterior surface (right) and a PET inner layer defining an interior surface (left), and barrier layer disposed between the outer layer and the inner layer having about 5-10 mol % poly(ethylene furan-2,5-dicarboxylate) (PEF) polymer.

This disclosure provides a multilayer polyester, particularly PET, container that has improved gas barrier properties over conventional monolayer PET container. For example, there is provided a 2,5-furandicarboxylate polyester barrier layer, such as for example a poly(ethylene furan-2,5-dicarboxylate) (PEF) barrier layer, that has superior gas barrier and mechanical properties relative to PET, that is "sandwiched" between two PET layers so as to achieve significantly higher barrier against gas permeation relative to conventional monolayer PET container of the same size and shape. Bottle and container designs provided by the approach disclosed herein are more stable with respect to PET degradation than many other designs from other attempts to enhance PET gas barrier properties. The present methods do not substantially impact the PET stretch ratio, meaning the existing equipment and methods typically can be used, and the clarity of the PET bottle or container is not adversely affected.

Throughout this disclosure and when the context allows, reference to poly(ethylene furan-2,5-dicarboxylate) (PEF) polymer or co-polymer may be used as an example of 2,5-furandicarboxylate polyesters or co-polyesters, and where particular weight or mole percentages and similar parameters are mentioned with respect to a PEF polymer or co-polymer, such parameters are also intended to be used with any 2,5-furandicarboxylate polyester or co-polyester disclosed herein.

When used in the multilayer containers particularly CSD containers, a number of a 2,5-furandicarboxylate polyester barrier layers were found to provide surprisingly improved results as barrier layers. While a poly(ethylene furan-2,5-dicarboxylate) (PEF) barrier layer is used as one example, suitable 2,5-furandicarboxylate polyester barrier layers can comprise, can consist of, can consist essentially of, or can be selected from: poly(ethylene-2,5-furandicarboxylate) (PEF); poly(trimethylene-2,5-furandicarboxylate) (PTF); poly(butylene-2,5-furandicarboxylate) (PBF); poly(isosorbide-2,5-furandicarboxylate) (PISF); poly(isoidide-2,5-furandicarboxylate) (PIIF); poly(isomannide-2,5-furandicarboxylate) (PIMF); poly(neopentylene-2,5-furandicarboxylate) (PNPGF); poly(ethylene-2,5-furandicarboxylate) with 1,8-naphthalene dicarboxylate (PEF-PEN), poly(1,4-phenylene-2,5-furandicarboxylate) (PCHF); poly(1,2-dimethylphenylene-2,5-furandicarboxylate) (PDMFF); and any combinations thereof, mixtures thereof, or copolymers thereof. In one aspect, for example, the poly(ethylene-2,5-furandicarboxylate) with 1,8-naphthalene dicarboxylate (PEF-PEN) can include about 10 mol % of 1,8-naphthalene dicarboxylate. These 2,5-furandicarboxylate polyesters are useful in providing barrier layers in a number of applications such as CSD containers as disclosed herein, but also are useful in fabricating, for example, fibers, films, containers including but not limited to CSD containers, molded parts, medical products such as bags for medical fluids, and the like. These and any of the 2,5-furandicarboxylate polyesters and co-polyesters according to this disclosure can have long-chained branching.

In a further aspect, a number of other types of 2,5-furandicarboxylate co-polyester barrier layers can provide surprisingly improved results as barrier layers. For example, co-polyesters of 2,5-furandicarboxylate with at least one or more of the following diols can provide barrier layer performance according to this disclosure: 2,2,4,4-tetramethyl-1,3-cyclobutanediol; 1,3-cyclohexanedimethanol; 1,4-cyclohexandimethanol; and any combination thereof. That is, the 2,5-furandicarboxylate polyester barrier layers disclosed herein can comprise, can consist of, can consist essentially of, or can be selected from any of these polyesters. For example, the co-polyesters of 2,5-furandicarboxylate such as those disclosed in WO 2014/100254 to Dow Chemical Company, which is incorporated herein by reference in pertinent part, can be used. Moreover, these 2,5-furandicarboxylate co-polyesters are useful in providing barrier layers in a number of applications such as CSD containers as disclosed herein, but also are useful in fabricating, for example, fibers, containers including but not limited to CSD containers, molded parts, medical products such as bags for medical fluids, and the like.

In a further aspect, this disclosure provides novel 2,5-furandicarboxylate polyesters and co-polyesters. For example, disclosed herein are the following novel polyesters and co-polyesters: poly(neopentylene-2,5-furandicarboxylate) (PNPGF); poly(ethylene-2,5-furandicarboxylate) with 1,8-naphthalene dicarboxylate (PEF-PEN); poly(1,4-phenylene-2,5-furandicarboxylate) (PCHF); poly(1,2-dimethylphenylene-2,5-furandicarboxylate) (PDMFF); and any combinations thereof, mixtures thereof, or copolymers thereof. These novel 2,5-furandicarboxylate polyesters and co-polyesters may also be used in providing barrier layers in a number of applications such as CSD containers as disclosed herein. These novel polyesters and co-polyesters may also be used in fabricating, for example, fibers, films, containers including but not limited to CSD containers, molded parts, medical products such as bags for medical fluids, and the like.

In one aspect, this disclosure provides for a multilayer container, the container comprising:
  a) an outer layer defining an exterior surface and an inner layer defining an interior surface and interior space, wherein the outer layer comprises a polyester; and
  b) the inner layer comprises a 2,5-furandicarboxylate polyester (for example, poly(ethylene furan-2,5-dicarboxylate) (PEF) polymer or co-polymer).

The container is typically stretch blow-molded from a preform that incorporates corresponding layers as set out here for the container itself. FIG. 1 illustrates one embodiment of this disclosure, in which the multilayer container is shown in cross-section, with PET outer and PEF inner layers.

According to a further aspect, each of the outer layer and the inner layer independently can have a thickness from about 0.1 mm to about 1.5 mm; alternatively from about 0.2 mm to about 1.2 mm; or alternatively from about 0.3 to 1 mm.

FIG. 1 illustrates one embodiment of this disclosure, in which the multilayer container is shown in cross-section, with PET outer and PEF inner layers shown, and the barrier layer disposed between the outer layer and the inner layer having about 5-10 wt. % of the total weight structure of poly(ethylene furan-2,5-dicarboxylate) (PEF) polymer.

According to a further aspect, each of the outer layer and the inner layer independently can have a thickness from about 0.1 mm to about 1.5 mm; alternatively from about 0.2 mm to about 1.2 mm; or alternatively from about 0.3 to 1 mm. The barrier layer can have a thickness from about 0.05 mm to about 1.2 mm; alternatively from about 0.075 mm to about 1 mm; or alternatively, from about 0.1 mm to about 0.8 mm.

The outer layer and the inner layer together can comprise from about 10 wt % to about 99 wt % of the total multilayer container weight; alternatively, from about 15 wt % to about 97.5 wt %; or alternatively, from about 20 wt % to about 95 wt % of the total multilayer container weight.

The 2,5-furandicarboxylate polyester, for example, poly(ethylene furan-2,5-dicarboxylate) (PEF) polymer that is sandwiched between the polyester outer and inner layers can comprise from about 0.1 mol % to about 20 mol % furan-2,5-dicarboxylic acid co-monomer and from about 80 mol % to about 99.9 mol % terephthalic acid co-monomer. Thus, useful amounts of PEF diacid co-monomer, typically expressed in the mole (mol) percentage, can vary widely. For example, useful amounts of diacid co-monomer are typically expressed in the mole (mol) percentages, and the PCH diacid and PAH diacid co-monomers can be used in the resins according to this disclosure in any amount, and the amounts will generally vary depending on the specific co-monomer to be incorporated. For example, the diacid co-monomer can be incorporated into the resin in ranges of about: from 1 to 20 mol %; alternatively from 2 to 15 mol %; alternatively, from 5 to 10 mol %; or alternatively, from 6 to 8 mol % of the total diacid monomer content. Therefore, the diacid co-monomer can be incorporated into the resin in mole percentages of about 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol, 18 mol %, 19 mol %, or 20 mol % of the total diacid monomer content. The diacid co-monomer also may be incorporated into the resin in ranges between any of these specific recited mole percentages (for example, from about 3 mol % to about 7 mole %), or alternatively still, may be present at less than, or less and equal to, any of these specific recited mole percentages (for example, less than about 20 mol % or less than about 10 mol %).

The 2,5-furandicarboxylate polyester such as the PEF polymer can have an intrinsic viscosity (I.V.) of from about 0.1 to about 2.0 dL/g. Alternatively, the PEF polymer can have an intrinsic viscosity of from about 0.2 to about 1.5 dL/g; alternatively, from about 0.3 to about 1.2 dL/g; and alternatively still, from about 0.4 to about 1.0 dL/g.

In various aspects, the 2,5-furandicarboxylate polyester such as a poly(ethylene furan-2,5-dicarboxylate) (PEF) polymer in the multilayer container has a weight average molecular weight (Mw) of about 10800 and an intrinsic viscosity (I.V.) of about 0.25 dL/g or greater. The PEF polymer also can have a Mw of about 45100 and an I.V. of about 0.65 dL/g or greater; or alternatively, PEF polymer also can have a Mw of about 62000 and an I.V. of about 0.80 dL/g or greater. The weight average molecular weight/I.V. relationship was measured by the Mark-Houwink equation.

Regarding the outer layer and the inner layer of the multilayer container, either one or both of the outer layer and the inner layer can comprise poly(ethylene terephthalate). Embodiments of the container have both the outer layer and the inner layer each comprising poly(ethylene terephthalate). Further, if desired, either one or both of the outer layer and the inner layer can comprise a poly(ethylene terephthalate)-based co-polymer, having diacid modification using a co-diacid, diol modification using a co-diol, or both. In this case, for example, either one or both of the outer layer and the inner layer can comprise a poly(ethylene terephthalate)-based co-polymer, having less than 20 mole percent diacid modification using a co-diacid, less than 10 mole percent diol modification using a co-diol, or both. Further, the outer layer and the inner layer can each include poly(ethylene terephthalate) having some recycled content.

If desired, the polyester composition of the outer layer and the inner layer of the multilayer container can comprises one or more polymers selected from homopolymers, copolymers or blends of polyethylene terephthalate (PET); polybutylene terephthalate (PBT); polypropylene terephthalate (PPT); polyethylene naphthalate (PEN); poly(ethylene furanoate) (PEF); and cyclohexane dimethanol/PET copolymer.

In the tables in the Examples section, the results of shelf life tests and barrier improvement factors for gas permeation for $CO_2$ loss (Table 2) and $O_2$ transmission (Table 3) are shown, in which the improvement in barrier improvement factor is demonstrated for the multilayer containers of this disclosure. In each case, a 20 gram (g), 12 ounce (oz) PEF multilayer contour bottle was tested, and compared with a PET monolayer bottle. The results of these data show that, even at elevated temperature and high relative humidity, the multilayer bottles maintain the barrier improvement factor (BIF) over the monolayer control bottle.

For example, in multilayer containers wherein the inner layer is a 2,5-furandicarboxylate polyester such as poly (ethylene furan-2,5-dicarboxylate) (PEF) polymer, the $CO_2$ and/or $O_2$ Barrier Improvement Factor (BIF) in the container relative to a monolayer PET container of substantially the same weight and dimensions can be from about 1.2 to about 1.3 (at room temperature). When the poly(ethylene furan-2,5-dicarboxylate) (PEF) inner layer polymer comprises about 7.5 wt. % of PEF, the container can have a $CO_2$ or $O_2$ Barrier Improvement Factor (BIF) relative to a monolayer PET container of substantially the same weight and dimensions at temperatures of about 22° C. and 38° C. is about 1.5. Increasing the poly(ethylene furan-2,5-dicarboxylate) (PEF) polymer inner layer to about 10 wt % of PEF, the container has a $CO_2$ or $O_2$ Barrier Improvement Factor (BIF) relative to a monolayer PET container of substantially the same weight and dimensions at temperatures of about 22° C. and 38° C. of about 1.6. In other aspects and examples, the multilayer container can have a shelf life of at least 13 weeks at room temperature for a 12 oz container, and a $CO_2$ or $O_2$ Barrier Improvement Factor (BIF) relative to a monolayer PET container of substantially the same weight and dimensions at room temperature from about 1.2 to about 1.7 or greater. In other aspects, at least one of the outer layer or inner layers and an optional barrier layer further comprises a gas barrier additive in a total amount of about 0.1 wt % to about 5 wt % of the multilayer container weight, if desired. At least one of the outer layer, the inner layer, and the optional barrier layer can further comprise, if desired, a colorant, a UV blocker, a lubricant, a slip agent, a processing aid, an antioxidant, an antimicrobial agent, a thermal stabilizer, or any combination thereof. Finally, this disclosure provides for a packaged beverage itself, that includes the disclosed multilayer container and a beverage disposed in the interior space of the multilayer container.

There is also provided in this disclosure a preform, in which the preform can comprise: a) an outer layer defining an exterior surface and an inner layer defining an interior surface, wherein each layer comprises a polyester; and b) a barrier layer disposed between the outer layer and the inner layer, the barrier layer comprising poly(ethylene furan-2,5-dicarboxylate) (PEF) polymer. Therefore, there is also disclosed a method of making a multilayer container that uses this preform, the method comprising providing a preform as disclosed herein, and stretch blow-molding the preform to provide the multilayer container.

In an aspect, one measure of the strength of the joint or interphase between layers was obtained using a modification of a ASTM D3163, "Standard Test Method for Determining Strength of Adhesively Bonded Rigid Plastic Lap-Shear Joints in Shear by Tension Loading." A modification of this method was used to accommodate the various shapes and sizes of the samples. The original samples tested were multilayer bottles used for Carbonated Soft Drinks (CSD), including: a 24 g multilayer CSD 500 mL bottle with 3.6 wt % MXD6 as the middle layer; 20 g multilayer CSD 330 mL bottle with 5 wt % PEF as the middle layer, and 19.5 g multilayer CSD 330 mL bottle with 3 wt % PLEMAT as the middle layer.

Figure 2:
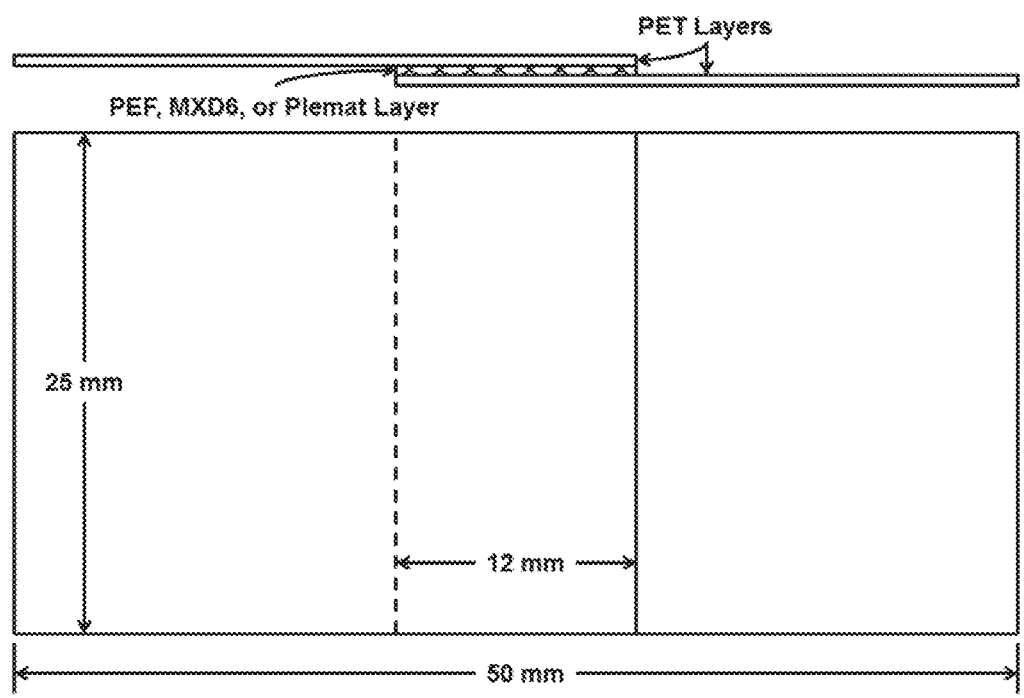
FIG. 2 illustrates the specimen dimensions used in testing the strength of the joint or interphase between layers of a CSD test bottle, using a modification of a ASTM D3163, "Standard Test Method for Determining Strength of Adhesively Bonded Rigid Plastic Lap-Shear Joints in Shear by Tension Loading." This modified testing was used to confirm that failure occurred first at the interphase of the layers before mechanical breaking of one of the substrate films or at the grips of the tensile testing unit.

Preliminary tests were conducted to confirm that failure occurred first at the interphase of the layers before mechanical breaking of one of the substrate films or at the grips of the tensile testing unit. FIG. 2 illustrates the specimen dimensions used in testing the strength of the joint or interphase between layers of a CSD test bottle, using a modification of ASTM D3163. The label panel of each bottle was used to prepare each test specimen. Samples were cut into strips 25 mm wide. Prior to the test, each specimen was carefully delaminated to leave a known overlapping area at the center in the loading direction. However, this preliminary delamination step was not feasible for the specimens containing the antiplasticizing compound PLEMAT, because PLEMAT, which is a modified PET, fused very well to the outer PET layers making this sample behave more like a monolayer with respect to delamination. As a result, the PLEMAT sample was not tested. The length of the overlap and the total length of the specimen were 12 and 50 mm, respectively, as illustrated in FIG. 2. The strips were cut so the load was applied in the hoop direction of the bottle. Seven specimens per sample were tested.

Table 1 summarizes the data obtained for interlayer strength results. At 95% confidence, significant statistical differences were observed between the multilayer samples. The PET samples containing PEF as the middle layer show higher delamination stress and delamination energy per area when compared with the PET samples containing MXD6 (crystalline polyamide produced by polycondensation of m-xylenediamine (MXDA) with adipic acid) as the middle layer. These results demonstrate the clearly better adhesion between the PEF and PET layers which helps reduce delamination of a multilayer film.

TABLE 1

Interlayer strength results

| Sample | Max Load (N) | | | Max Stress (kPa) | | | Delamination Energy per Area (J/m^2) | | |
|---|---|---|---|---|---|---|---|---|---|
| | Average | Std Dev. | 95% Confidence Interval | Average | Std Dev. | 95% Confidence Interval | Average | Std Dev. | 95% Confidence Interval |
| 5 wt % PEF | 107.4 | 16.6 | 15.3 | 358.0 | 55.2 | 51.1 | 74.6 | 23.3 | 21.6 |
| 3.6 wt % MXD6 | 60.6 | 15.0 | 13.9 | 202.1 | 50.1 | 46.3 | 29.8 | 10.4 | 9.6 |
| 3 wt % PLEMAT | | | | | N/A | | | | |

EXAMPLES

Multilayer PEF/PET preforms with a different preform design (18 g) capable of stretching to higher stretch ratios on the reheat stretch blow molding were manufactured and blown into 12 oz. contour bottles. Bottles were tested for comparison with the monolayer PET bottles of the same weight and size. Some basic polymer and bottle characterization parameters are provided in Table 2.

TABLE 2

Some basic polymer and bottle characterization parameters

| Parameter | Control | 5% PEF | 10% PEF | 15% PEF |
|---|---|---|---|---|
| Preform Solution IV (dL/g) | 0.790 | 0.790 | 0.780 | 0.800 |
| Bottle Weight (g) | 18.1 | 18.1 | 18.1 | 18.1 |
| Max. Volume Expansion (%) | 67 | 86 | 66 | 61 |

It was found that there is no significant diminishment in the mechanical or thermal properties of the bottles due to the incorporation of PEF in the middle layer, when compared to the monolayer control bottle. Consequently the physical performance the multilayer bottles are very similar to that of the monolayer control bottles.

The tables below show the results of shelf life tests and barrier improvement factors for gas permeation, with $CO_2$ loss shown in Table 3. In Table 3, the FTIR predicted shelf life results show enhancement in resistance to permeation by $CO_2$ for the PEF multilayer 20 g, 12 oz. contour bottles over the monolayer bottles. (Throughout, gram is abbreviated g or gm, and ounce is typically abbreviated oz.)

TABLE 3

$CO_2$ barrier improvement data for PEF multilayer 18 g, 12 oz. contour bottles

| Variable | $CO_2$ Barrier Improvement (22° C., 50% RH) | |
|---|---|---|
| 18 g, 12 oz Contour | Shelf Life (wks.) | BIF |
| Control | 10.0 | 1.0 |
| 5% PEF | 11.9 | 1.19 |
| 10% PEF | 14.4 | 1.44 |
| 15% PEF | 19.7 | 1.97 |

Multilayer PET/PEF 16 gm higher stretch ratio preforms based on the core rod change to the 18 gm preform design were manufactured and blown into 12 oz. contour bottles. Bottles were tested for comparison with the monolayer PET bottles of the same weight and size. Some basic polymer and bottle characterization parameters are provided in Table 4.

TABLE 4

Some basic polymer and bottle characterization parameters

| Parameter | Control | 10% PEF |
|---|---|---|
| Preform Solution IV (dL/g) | 0.790 | 0.790 |
| Bottle Weight (g) | 16.2 | 16.3 |
| Max. Volume Expansion (%) | 67 | 101 |

It was found that there is no significant diminishment in the mechanical or thermal properties of the bottles due to the incorporation of PEF in the middle layer, when compared to the monolayer control bottle. Consequently the physical performance the multilayer bottles are very similar to that of the monolayer control bottles.

The tables below show the results of shelf life tests and barrier improvement factors for gas permeation, with $CO_2$ loss shown in Table 5. In Table 5, the FTIR predicted shelf life results show enhancement in resistance to permeation by $CO_2$ for the PEF multilayer 20 g, 12 oz contour bottles over the monolayer bottles.

TABLE 5

$CO_2$ barrier improvement data for PEF multilayer 16 g, 12 oz. contour bottles

| Variable | $CO_2$ Barrier Improvemet (22° C., 50% RH) | |
|---|---|---|
| 16 g, 12 oz Contour | Shelf life (wks.) | BIF |
| Control | 7.9 | 1.0 |
| 10% PEF | 15.5 | 1.96 |

Multilayer PEF/PET preforms (20 grams) were manufactured and stretch blow-molded into 12 oz. contour bottles. Bottles were tested for comparison with the monolayer PET bottles of the same weight and size. Some basic polymer and bottle characterization parameters are provided in Table 6.

TABLE 6

Some basic polymer and bottle characterization parameters

| Parameter | Control | 5% PEF | 7.5% PEF | 10% PEF |
|---|---|---|---|---|
| Preform Solution IV (dL/g) | 0.807 | 0.809 | 0.804 | 0.810 |
| Bottle Weight (g) | 19.9 | 19.98 | 20.10 | 20.10 |
| Max. Volume Expansion (%) | 78.7 | 82.3 | 96.9 | 80.0 |

It was found that there is no significant diminishment in the mechanical or thermal properties of the bottles due to the incorporation of PEF in the middle layer, when compared to the monolayer control bottle. Consequently the physical performance the multilayer bottles are very similar to that of the monolayer control bottles.

The tables below show the results of shelf life tests and barrier improvement factors for gas permeation, with $CO_2$ loss shown in Table 7 and $O_2$ transmission shown in Table 8. In Table 7, the FTIR predicted shelf life results show enhancement in resistance to permeation by both $CO_2$ and $O_2$ for the PEF multilayer 20 g, 12 oz contour bottles over the monolayer bottles. Even at elevated temperature and relative humidity, results show that the multilayer bottles maintain the barrier improvement factor (BIF) over the monolayer control bottle.

TABLE 7

$CO_2$ barrier improvement data for PEF multilayer 20 g, 12 oz. contour bottles according to the disclosure

| Variable | $CO_2$ Barrier Improvement (22° C., 50% RH) | | $CO_2$ Barrier Improvement (38° C., 85% RH) | | $CO_2$ Barrier Improvement Theoretical |
|---|---|---|---|---|---|
| 20 g, 12 oz Contour | Shelf Life (wks.) | BIF | Shelf Life (wks.) | BIF | Calculation BIF |
| Control | 10.71 | 1.0 | 5.4 | 1.0 | 1.0 |
| 5% PEF | 13.79 | 1.3 | 6.6 | 1.2 | 1.3 |
| 7.5% PEF | 16.32 | 1.5 | 8.2 | 1.5 | 1.5 |
| 10% PEF | 17.35 | 1.6 | 9.5 | 1.8 | 1.6 |

Calculations of the $CO_2$ barrier improvement (22° C., 50% Relative Humidity (RH)) for the PEF multilayer 20 g, 12 oz contour bottles over the monolayer bottle has been based on assuming the barrier of PEF is 7.0 times that of PET (this will correspond to a semi-crystalline PET) and using the following equation:

$$BIF = B_{PET}(1-x) + B_{PEF}(x),$$

where $B_{PET}$ is barrier of PET and $B_{PEF}$ is barrier of PEF and x is the masslayer fraction of PEF. However, it is possible theoretically to achieve PEF barrier as high as 19 times that of amorphous PET. The theoretical values of the $CO_2$ barrier improvement at higher temperature and higher humidity (38° C., 85% RH) match the experimental values at PEF barrier which is 16 times that of amorphous PET.

Similar improvement has been observed in the oxygen ($O_2$) barrier enhancement for the multilayer bottles over the monolayer PET bottles as can be seen in the following table.

the gas through the $i^{th}$ layer of the multilayer bottle wall ($cm^3$ (STP)·mil/$m^2$·d·atm), $P_{am,i}$ is the permeability of the gas through the amorphous phase of the $i^{th}$ layer of the multilayer wall of the bottle, and $\chi_i$ is the crystalline volume fraction of the $i^{th}$ layer of the bottle wall.

The BIF was computed via the equation:

$$BIF = \frac{P_{am,PET}(1-\chi_{PET})^2}{P_{am,i}(1-\chi_i)^2}$$

where the subscript i in the preceding equation can refer to either PET or PEF. If the index i refers to PET, then BIF is unity.

TABLE 8

CO₂/Oxygen barrier improvement data for PEF multilayer contour bottles

| Variable | Measured $O_2$ Transmission ($cm^3$ (STP)/pkg · day) | Actual BIF ($O_2$) | Calculated $O_2$ Transmission ($cm^3$(STP)/pkg · d) | Calculated BIF ($O_2$) | Theoretically Calculated BIF ($O_2$, Simple Equation) | Calculated $CO_2$ Transmission ($cm^3$(STP)/pkg · d) | Calculated BIF ($CO_2$) | Theoretically Calculated BIF ($CO_2$, Simple Equation) |
|---|---|---|---|---|---|---|---|---|
| Control | 0.032 | — | 0.033 | 1.0 | 1.0 | 3.0 | 1.0 | 1.0 |
| 5% PEF | 0.026 | 1.2 | 0.027 | 1.2 | 1.2 | 2.1 | 1.4 | 1.3 |
| 7.5% PEF | 0.022 | 1.5 | 0.025 | 1.3 | 1.3 | 1.9 | 1.6 | 1.5 |
| 10% PEF | 0.020 | 1.6 | 0.024 | 1.4 | 1.4 | 1.7 | 1.8 | 1.7 |
| 15% PEF | — | — | 0.021 | 1.6 | 1.6 | 1.4 | 2.2 | 2.0 |
| 25% PEF | — | — | 0.016 | 2.0 | 2.0 | 1.0 | 3.0 | 2.7 |
| 50% PEF | — | — | 0.011 | 3.0 | 3.1 | 0.6 | 5.0 | 4.4 |
| 75% PEF | — | — | 0.0080 | 4.1 | 4.1 | 0.4 | 7.0 | 6.2 |
| 100% PEF | — | — | 0.0063 | 5.2 | 5.2 | 0.3 | 9.0 | 7.9 |

The theoretical calculation of the Oxygen barrier improvement has also been carried out assuming that the barrier of PEF is 5.2 times that of semi-crystalline PET.

These results demonstrate that incorporating PEF with PET in a multilayer structure can lead to substantially enhanced gas barrier properties of the multilayer bottle without adversely impacting other critical performance characteristics of the multilayer containers.

Carbon dioxide ($CO_2TR$) and oxygen ($O_2TR$) transmission rates for monolayer and multilayer bottles are computed using $CO_2$ and $O_2$ permeability values for PET and PEF obtained from scientific literature (Burgess et al. citation) referenced to 22° C. (this calculation can work at any given temp. such as 38° C. so long as it is determined what the permeability activation energy for the particular polymer at any temperature including 38° C.). The respective gas transmission rate GTR (i.e. $CO_2TR$ or $O_2TR$) through the bottle wall was determined using the conventional equation for a multilayer membrane structure:

$$GTR = \frac{A\Delta p}{\left(\sum_{i=1}^{i=N}\frac{l_i}{P_i}\right)} = \frac{A\Delta p}{\left(\sum_{i=1}^{i=N}\frac{l_i}{P_{am,i}(1-\chi_i)^2}\right)}$$

The variables in the foregoing equation are defined with (units) as follows: A is the bottle area below the finish through which gas permeation proceeds ($m^2$), $\Delta p$ is the partial pressure difference of the transmitting gas across the membrane or bottle wall (atm), $l_i$ is the thickness of the $i^{th}$ layer in the multilayer bottle (mil), $P_i$ is the permeability of Using the assumed co-injected bottle layer thicknesses, the GTR was computed using the equations above with the following values:

For $CO_2$ with $\Delta p=4.20$ atm:

$P_{am,PET}$(22° C.)=854 $cm^3$(STP)·mil/$m^2$·d·atm
$\chi_{PET}=0.35$ $P_{am,PEF}$(22° C.)=46.2 $cm^3$(STP)·mil/$m^2$·d·atm
$\chi_{PEF}=0.10$ For $O_2$ with $\Delta p=0.21$ atm:

$P_{am,PET}$(22° C.)=186 $cm^3$(STP)·mil/$m^2$·d·atm
$\chi_{PET}=0.35$ $P_{am,PEF}$(22° C.)=18.7 $cm^3$(STP)·mil/$m^2$·d·atm
$\chi_{PEF}=0.10$ In all cases the bottle surface area A was 0.03076 $m^2$. Using the values above, the maximum BIF for carbon dioxide $CO_2$ was determined to be:

$$BIF_{CO_2} = \frac{854(1-0.35)^2}{46.2(1-0.1)^2} = 9.65$$

And, similarly for oxygen $O_2$:

$$BIF_{O_2} = \frac{186(1-0.35)^2}{18.7(1-0.1)^2} = 5.19$$

Accordingly, this disclosure also provides a polyester multilayer bottle comprising at least one layer of an FDCA (2,5-furandicarboxylate)-based polyester, co-polyester, or polyester or co-polyester blend with an oxygen permeability less than about 600 cm³ (STP)·mil/m²·d·atm at 23° C. or a carbon dioxide permeability less than about 170 cm³ (STP)·mil/m²·d·atm at 23° C.

DEFINITIONS

To define more clearly the terms used herein, the following definitions are provided to further explain and elaborate various aspects of this disclosure, which are applicable herein unless otherwise indicated by the disclosure itself or the context. To the extent that any definition or usage provided by any document incorporated herein by reference conflicts with the definition or usage provided herein, the definition or usage provided herein controls.

The term "carbonated soft drink (CSD)" bottles or container is used herein to refer to the containers of this disclosure that are designed for use under pressure, such as carbonation, without specific limitation as to the intended contents of the container. Generally, the term "container" is used interchangeably with the term "bottle" unless the context requires otherwise.

A "co-polyester" resin is a polyethylene terephthalate-based polyester resin that contains units derived from at least one other dicarboxylic acid co-monomer along with the terephthalic acid co-monomer in the polymer resin structure and/or at least one other diol co-monomer along with the ethylene glycol co-monomer in the polymer resin structure. These resins may also be referred to as a polyethylene terephthalate (PET)-based co-polymers or co-polyester resins. Typically, the mole fraction or percentage of the total other dicarboxylic co-monomers is less than the mole fraction or percentage of terephthalic acid co-monomers in the resin. Also typically, the mole fraction or percentage of the total other diol co-monomers is typically less than the mole fraction or percentage of ethylene glycol co-monomers in the resin.

As used in the specification and the appended claims, the singular forms "a," "an," and "the" include plural referents, unless the context clearly dictates otherwise. Thus, for example, reference to "a light" includes a single light as well as any combination of more than one light if the contact indicates or allows, such as multiple UV lights that are used in combination.

Throughout the specification and claims, the word "comprise" and variations of the word, such as "comprising" and "comprises," means "including but not limited to," and is not intended to exclude, for example, other additives, components, elements, or steps. While compositions and methods are described in terms of "comprising" various components or steps, the compositions and methods can also "consist essentially of" or "consist of" the various components or steps.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places in the specification are not necessarily all referring to the same embodiment. Furthermore, the particular features, aspects, structures, or characteristics may be combined in any suitable manner in one or more embodiments.

"Optional" or "optionally" means that the subsequently described element, component, step, or circumstance can or cannot occur, and that the description includes instances where the element, component, step, or circumstance occurs and instances where it does not.

Throughout this specification, various publications may be referenced. The disclosures of these publications are hereby incorporated by reference in pertinent part, in order to more fully describe the state of the art to which the disclosed subject matter pertains. The references disclosed are also individually and specifically incorporated by reference herein for the material contained in them that is discussed in the sentence in which the reference is relied upon. To the extent that any definition or usage provided by any document incorporated herein by reference conflicts with the definition or usage applied herein, the definition or usage applied herein controls.

Unless indicated otherwise, when a range of any type is disclosed or claimed, for example a range of the sizes, number, percentages, and the like, it is intended to disclose or claim individually each possible number that such a range could reasonably encompass, including any sub-ranges or combinations of sub-ranges encompassed therein. When describing a range of measurements such as sizes or percentages, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, or ±3% of the stated value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

What is claimed is:

1. A multilayer container, the container comprising:
   an outer layer defining an exterior surface, an inner layer defining an interior surface and an interior space, and a clear barrier layer disposed between the outer layer and the inner layer, wherein:
   the inner layer and the outer layer comprise poly(ethylene terephthalate) (PET);
   each of the outer layer and the inner layer independently has a thickness from about 0.2 mm to about 1.2 mm; and
   the barrier layer is a 2,5-furandicarboxylate and terephthalate co-polyester consisting essentially of two carboxylate co-monomers and one diol monomer, wherein the two carboxylate co-monomers are furan-2,5-dicarboxylate and terephthalate, and wherein the one diol monomer is selected from the group consisting of isosorbide, isoiodide, isomannide, 1,4-phenylene diol, 1,2-dimethylphenylene diol, 1,3-cyclohexanedimethane diol, and 1,4-cyclohexanedimethane diol; and
   the 2,5-furandicarboxylate and terephthalate co-polyester comprises from 0.1 mol % to 20 mol % furan-2,5-dicarboxylate co-monomer and from 80 mol % to 99.9 mol % terephthalate co-monomer.

2. A multilayer container according to claim 1, wherein the container is stretch blow-molded.

3. A multilayer container according to claim 1, wherein the barrier layer is 5 wt % or greater of the total multilayer container weight.

4. A multilayer container according to claim 1, wherein the 2,5-furandicarboxylate and terephthalate co-polyester has a weight average molecular weight (Mw) of about 62,000 and an intrinsic viscosity of about 0.80 dL/g or greater.

5. A multilayer container according to claim 1, wherein either one or both of the outer layer and the inner layer comprises a poly(ethylene terephthalate)-based co-polymer, having diacid modification using a co-diacid, diol modification using a co-diol, or both.

6. A multilayer container according to claim 1, wherein the outer layer and the inner layer each comprise poly (ethylene terephthalate) having recycled content.

7. A multilayer container according to claim 1, wherein:
   the 2,5-furandicarboxylate and terephthalate co-polyester has a $CO_2$ or $O_2$ Barrier Improvement Factor (BIF) relative to a monolayer PET container of substantially the same weight and dimensions at about 22° C. or at about 38° C. is from about 1.0 to about 2.0.

8. A multilayer container according to claim 1, wherein the container has:
   a) a shelf life of at least 13 weeks at room temperature when configured as a 12 oz. container; and
   b) a $CO_2$ or $O_2$ Barrier Improvement Factor (BIF) relative to a monolayer PET container of substantially the same weight and dimensions at about 22° C. or about 38° C. from about 1.2 to about 1.7.

9. A multilayer container according to claim 1, wherein at least one of the outer layer or the inner layer further comprises a gas barrier additive in a total amount of about 0.1 wt % to about 5 wt % of the multilayer container weight.

10. A multilayer container according to claim 1, wherein at least one of the outer layer or the inner layer further comprises a colorant, a UV blocker, a lubricant, a slip agent, a processing aid, an antioxidant, an antimicrobial agent, a thermal stabilizer, or any combination thereof.

11. A packaged beverage comprising the multilayer container according to claim 1 and a beverage disposed in the interior space of the multilayer container.

12. A multilayer container according to claim 1, wherein the barrier layer has from 3 mol % to 20 mol % 2,5-furandicarboxylate co-monomer.

13. A multilayer container according to claim 1, wherein the barrier layer has from 8 mol % to 20 mol % 2,5-furandicarboxylate co-monomer.

14. A multilayer container according to claim 1, wherein the barrier layer has a weight average molecular weight (Mw) of from about 10800 to about 62000 and an intrinsic viscosity (I.V.) of about 0.25 dL/g or greater, as calculated by the Mark-Houwink equation.

15. A multilayer container according to claim 1, wherein the multilayer container has an oxygen permeability less than about 600 cm$^3$ (STP)·mil/m$^2$d·atm at 23° C. and a carbon dioxide permeability less than about 170 cm$^3$ (STP) ·mil/m$^2$d·atm at 23° C.

16. A multilayer container according to claim 1, wherein the barrier layer has from 10 mol % to 20 mol % 2,5-furandicarboxylate co-monomer.

17. A multilayer container according to claim 1, wherein the barrier layer has about 20 mol % 2,5-furandicarboxylate co-monomer.

18. A multilayer container according to claim 1, wherein the one diol monomer is selected from the group consisting of isosorbide, isoiodide, isomannide, 1,4-phenylene diol, 1,2-dimethylphenylene diol, and 1,3-cyclohexanedimethane.

19. A multilayer container according to claim 1, wherein the 2,5-furandicarboxylate and terephthalate co-polyester is characterized by long-chained branching.

20. A multilayer container, the container comprising:
   an outer layer defining an exterior surface, an inner layer defining an interior surface and an interior space, and a clear barrier layer disposed between the outer layer and the inner layer, wherein:
   the inner layer and the outer layer comprise poly(ethylene terephthalate) (PET);
   the barrier layer is a 2,5-furandicarboxylate and terephthalate co-polyester consisting essentially of two carboxylate co-monomers and one diol monomer, wherein the two carboxylate co-monomers are furan-2,5-dicarboxylate and terephthalate, and wherein the one diol monomer is selected from the group consisting of isosorbide, isoidide, isomannide, 1,4-phenylene diol, 1,2-dimethylphenylene diol, 1,3-cyclohexanedimethane diol, and 1,4-cyclohexanedimethane diol; and the 2,5-furandicarboxylate and terephthalate co-polyester comprises from 0.1 mol % to 20 mol % furan-2,5-dicarboxylic acid co-monomer and from 80 mol % to 99.9 mol % terephthalic acid co-monomer.

21. A multilayer container according to claim 20, wherein the barrier layer has from 3 mol % to 20 mol % 2,5-furandicarboxylate co-monomer.

22. A multilayer container according to claim 20, wherein the barrier layer has from 8 mol % to 20 mol % 2,5-furandicarboxylate co-monomer.

23. A multilayer container according to claim 20, wherein the barrier layer has a weight average molecular weight (Mw) of from about 10800 to about 62000 and an intrinsic viscosity (I.V.) of about 0.25 dL/g or greater, as calculated by the Mark-Houwink equation.

24. A multilayer container according to claim 20, wherein the multilayer container has an oxygen permeability less than about 600 $cm^3$ (STP)·mil/$m^2$·d·atm at 23° C. and a carbon dioxide permeability less than about 170 $cm^3$ (STP)·mil/$m^2$·d·atm at 23° C.

25. A multilayer container according to claim 20, wherein the barrier layer has from 10 mol % to 20 mol % 2,5-furandicarboxylate co-monomer.

26. A multilayer container according to claim 20, wherein the barrier layer has about 20 mol % 2,5-furandicarboxylate co-monomer.

27. A multilayer container according to claim 20, wherein the one diol monomer is selected from the group consisting of isosorbide, isoidide, isomannide, 1,4-phenylene diol, 1,2-dimethylphenylene diol, and 1,3-cyclohexanedimethane.

28. A multilayer container according to claim 20, wherein the 2,5-furandicarboxylate and terephthalate co-polyester is characterized by long-chained branching.

* * * * *